US008830968B2

(12) United States Patent
Lin et al.

(10) Patent No.: US 8,830,968 B2
(45) Date of Patent: Sep. 9, 2014

(54) METHOD AND APPARATUS FOR MAPPING MULTI-STANDARD IQ DATA BASED ON CPRI

(75) Inventors: Yuping Lin, Guangdong Province (CN); Chao Du, Guangdong Province (CN); Dandan Guo, Guangdong Province (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 19 days.

(21) Appl. No.: 13/258,186

(22) PCT Filed: Nov. 30, 2010

(86) PCT No.: PCT/CN2010/079289
§ 371 (c)(1),
(2), (4) Date: Dec. 12, 2012

(87) PCT Pub. No.: WO2011/147172
PCT Pub. Date: Dec. 1, 2011

(65) Prior Publication Data
US 2013/0077603 A1 Mar. 28, 2013

(30) Foreign Application Priority Data

May 25, 2010 (CN) .......................... 2010 1 0186638

(51) Int. Cl.
*H04W 72/04* (2009.01)
*H04W 84/12* (2009.01)
*H04W 84/18* (2009.01)
*H04W 28/06* (2009.01)

(52) U.S. Cl.
CPC .......... *H04W 72/0446* (2013.01); *H04W 28/06* (2013.01)
USPC ....................................................... 370/336

(58) Field of Classification Search
CPC . H04W 72/0446; H04W 84/12; H04W 84/18; H04W 28/04; H04W 28/06
See application file for complete search history.

(56) References Cited

U.S. PATENT DOCUMENTS

| 8,018,910 B2* | 9/2011 | Jiang et al. ..................... 370/342 |
| 2009/0092117 A1* | 4/2009 | Jiang et al. ..................... 370/342 |

(Continued)

FOREIGN PATENT DOCUMENTS

| CN | 100403826 C | 7/2008 |
| CN | 101325449 A | 12/2008 |
| CN | 101860394 A | 10/2010 |
| WO | WO 2008022018 A2 * | 2/2008 |

OTHER PUBLICATIONS

CPRI Spec V4.1, titled "CPRI Specification V4.1 (Feb. 18, 2009) Interface Specification Common Public Radio Interface (CPRI); Interface Specification," (CPRI Spec V41 hereinafter) was published by CPRI—(Ericsson AB, Huawei Technologies Co. Ltd, NEC Corporation, Nortel Networks Ltd, Alcatel Lucent and Nokia Siemens Networks GmbH & Co. KG in Feb. 2009.*

(Continued)

*Primary Examiner* — Andrew Lai
*Assistant Examiner* — Hoyet H Andrews
(74) *Attorney, Agent, or Firm* — Banner & Witcoff, Ltd.

(57) ABSTRACT

The invention provides a method for IQ data mapping, including the following steps of: mapping IQ data of one or more standards to a CPRI radio frame, wherein, the CPRI radio frame includes multiple multi-frames, and boundaries of the multi-frames are aligned with the header of the CPRI radio frame, and each multi-frame includes K basic frames, and each basic frame includes a plurality of IQ sub-containers, and one IQ sub-container constitutes one time slot, and the number K of the basic frames and bit widths Naxc of the IQ sub-containers included in each multi-frame are identical for different standards, and the length of the CPRI radio frame is 10ms. The invention also provides an IQ data mapping apparatus.

15 Claims, 8 Drawing Sheets

(56) References Cited

U.S. PATENT DOCUMENTS

2011/0255497 A1* 10/2011 Pan et al. .................. 370/329
2011/0286540 A1* 11/2011 Jiang et al. ................. 375/259
2013/0163524 A1* 6/2013 Shatzkamer et al. ........ 370/329

OTHER PUBLICATIONS

Horlin, F.; De Rore, S.; Lopez-Estraviz, E.; Naessens, F.; Van der Perre, L., "Impact of frequency offsets and IQ imbalance on MC-CDMA reception based on channel tracking," Selected Areas in Communications, IEEE Journal on , vol. 24, No. 6, pp. 1179,1188, Jun. 2006, doi: 10.1109/JSAC.2005.864018.*

Han, F.Y.; Wu, J. -M; Horng, T. -S; Lin, J.; Tu, C.C., "Implementation of a W-CDMA direct-conversion IQ modulator module including evaluation of chip-package-board interactions," Electronic Components and Technology Conference, 2006, Proceedings. 56th , vol., No., pp. 6 pp.,, 0-0 0 doi: 10.1109/ECTC.2006.1645891.*

International Search Report for PCT/CN2010/079289 dated Feb. 25, 2011.

* cited by examiner

W: Number of words included in one basic frame
Y: Number of bytes included in one word
X: Number of basic frames
Z: Number of super frames

METHOD AND APPARATUS FOR MAPPING MULTI-STANDARD IQ DATA BASED ON CPRI

TECHNICAL FIELD

The present invention relates to the distributed base transceiver station technology in a mobile communications system, and especially to a method for implementing multi-standard IQ signal mixed-mode transmission and switch based on the common public radio interface (CPRI) protocol, and to an apparatus for implementing the method.

BACKGROUND OF THE RELATED ART

1. Structure of a CPRI Distributed Base Transceiver Station

In mobile communications system, a radio access network is composed of a BTS (base transceiver station) and a BSC (base station controller) or a RNC (radio network controller), as shown in FIG. 1. Wherein, a distributed BTS is mainly composed of a BBU (base band unit) and a RRU (remote radio unit), as shown in FIG. 2.

In the CPRI protocol, a term REC (radio equipment controller) corresponds to a BBU, and a RE (radio equipment) corresponds to a RRU. The CPRI protocol provides the norm for the interface between a REC and a RE, which belongs to internal interfaces of a BTS and may be connected by way of optical fibers or cables. The norm is available at the web site http://www.cpri.info. The industry currently uses the norm widely to develop a distributed BTS system. The diagram of the interconnection of REC/RE is as shown in FIG. 3.

2. A CPRI Protocol Stack

The CPRI defines the contents of layer 1 and layer 2 of a radio interface. The physical layer uses 8B/10B encoding, and the SERDES line rate supports a series of ranks such as 614.4/1228.8/2457.6/3072/4915.2/6144 Mbps and so on.

The data link layer provides that the period for each basic frame is 1/3.84 M (about 260.42 ns), which is composed of 1 control word plus an IQ area of 15 words, as shown in FIG. 4. Every 256 basic frames compose a super frame, and 150 super frames compose a radio frame of 10 ms, as shown in FIG. 5.

The IQ field of 15 words in a basic frame is partitioned into a plurality of IQ containers (AxC container). The partition result of the 1.2288 g line rate is as shown in FIG. 6. For the WCDMA standard, since its chip rate is equal to the CPRI basic frame frequency, the data of a load sector can be precisely put into an IQ container.

No IQ data mapping methods of standards other than WCDMA is defined in CPRI2.1 and previous versions.

In the latest CPRI4.1 version, three methods are complemented to load a certain standard (such as WIMAX, which may be also applied to CDMA) whose sampling frequency is not integral multiple of 3.84M. They all define the structure of the AxC Container Block, which takes K-chip (K chips) as a period.

Method 1: the period of the AxC Container Block, K=LCM(fs,fc)/fs includs S=LCM(fs,fc)/fc IQ sampling values, and the bit wide of an AXC container (AxC container) differs along with the standards Naxc=2*ceil(M*fs/fc).

Wherein, 1 chip period herein always refers to the chip period of WCDMA, which is equal to the CPRI basic frame period 260.42 ns. The fs in the above equations is a sampling frequency of a standard, fc is the frequency of a CPRI basic frame 3.84M, M is the sampling bit wide of the standard, LCM is the least common multiple, ceil represents rounding up.

Method 2, similar with the method 1, the difference being that the period of AxC-container-block in the method 2 is the frame period of WIMAX 5 ms (larger than that in method 1, being a multiple of the period in method 1).

Method 3, the calculations for the period K for the AxC Container Block and the number S of IQ sampling values included in each period are the same as in the method 1, except that the bit wide of an AXC container Naxc=2*M is equal to one load sector I+Q data volume; Na load sectors may be bundled together and put in Nc containers of one basic frame, Nc=ceil(Na*S/K).

3. Problems Existing in Implementing Multi-Standard IQ Mixed-Mode Transmission Through CPRI The three IQ mapping methods newly added to CPRI4.1 may implement a specific IQ transmission of a certain standard other than WCDMA. However, for a mixed-mode application scene simultaneously having several standards, as shown in FIG. 7, there exist some problems difficult to solve.

In a multi-standard mixed-mode application, a RRU will support multiple standards, one piece of fiber will simultaneously transmit IQ signals of multiple standards, and a plurality of base band units of different standards will also exist inside an REC, where a switch unit is needed to switch multi-standard IQ signals to all the optical interfaces. For example, a plurality of load sector IQ signals of one base band unit need to be switched respectively to a plurality of optical interfaces and connected respectively to a plurality of REs. Wherein, the high speed interconnection between the switch unit inside the REC and each base band unit may also use a fame structure similar to CPRI.

There will exist many problems in using any of the above three methods when the LCM of a standard's sampling period of the mixed-mode and the CPRI basic frame's period is too large, i.e. K values corresponding to their AxC-container-block are too large (cycle period is K/fc), for example, K corresponding to CDMA2000-1X is 25; WIMAX-10M corresponds to a sampling frequency of 11.2M and a K=12.

Problem 1: if method 1 or method 2 of CPRI4.1 is used, the values corresponding to hit widths of IQ containers (Naxc) of various standards are different from one another because of different sampling frequencies and different sampling bit widths; in order to perform IQ switch of various standards at the REC, the switch unit needs to support simultaneously various different bit widths (difference will be large), which is difficult to implement.

Problem 2: if method 3 of CPRI4.1 is used, in order to perform IQ switching of various standards at the REC, the switched bit widths may be the same if the IQ sampling bit widths of various standards are the same, but the cycle periods of various standards are different. For example, one AxC-container-block of CDMA includes three load sectors IQ, and the cycle period K1=25; one AxC-container-block of LTE1.4M includes two load sectors IQ, and the cycle period K2=2. To support multi-standard IQ mixed-mode switch, a plurality of IQ switch units (one for each standard) may be used inside the REC, which requires a larger expense on logic resources. Or, the plurality of switch units are integrated into one switch unit but the switching is implemented using a common multiple of cycle periods of various standards as the period which however will have a big delay and thus is not acceptable.

Problem 3: if the method 1/2/3 of CPRI4.1 are used, it needs to ensure that the AxC-container-block of each standard is aligned with the boundary of 10 ms radio frame of CPRI (or with an offset of a configurable value) in order to transmit frame timing information of various standards in the situation of mixed-mode RRU cascade. When combining the received signals returned from the downstream, an intermediate-stage RRU firstly needs to analyze the IQ signals returned from the downstream according to the standard, combines with the uplink IQ data of current RRU, and then regroups frames according to the 10 ms frame header Fr from the port TX. Since the cycle period K of each standard is different, each standard needs to process separately, the cost of which is very big. Or, the signals received from the downstream are delayed for a certain length of time to make the boundary of AxC-container-block of each standard aligned with the 10 ms frame header Fr from the direction of the port TX at the current stage, and then the uplink data of the current stage is inserted. However, in this method, the delay of downstream data needs to reach the common multiple of the cycle periods K of all standards, i.e. LCM (K1, K2 . . .) in the most extreme case to make alignment, and the delay is too big to be acceptable.

In addition, the IQ combination, switch and other processes for multi-standard mixed-mode application scene in these schemes are generally related to the standard, and the link's intermediate nodes need to be modified for every newly added standard, which is not flexible.

SUMMARY OF THE INVENTION

The invention provides a method and an apparatus which can efficiently support IQ mapping, transmission and switch of a mixed-mode application of multiple radio standards, and the method and apparatus can further keep compatible with the IQ mapping mode of WCDMA in the existing CPRI protocol.

To solve the above problem, the invention provides a method for IQ data mapping, comprising: mapping IQ data of one or more standards to a CPRI radio frame, wherein, the CPRI radio frame comprises multiple multi-frames, and boundaries of the multi-frames are aligned with a header of the CPRI radio frame; each multi-frame comprises K basic frames, and each basic frame comprises a plurality of IQ sub-containers; one IQ sub-container constitutes one time slot; a number K of the basic frames and bit widths Naxc of the IQ sub-containers included in each multi-frame for different standards are identical; and a length of the CPRI radio frame is 10 ms.

In the above method, for any standard, the step of mapping the IQ data of the standard to the CPRI radio frame may comprise:

when fs is an integer multiple of fc/K, mapping the IQ data in one load sector or the IQ data and a filling field in one load sector of the standard to Nc IQ sub-containers in one multi-frame in the CPRI radio frame; wherein, Nc=ceil[(fs*N*M)/(Naxc*fc/K)], fs is a sampling frequency of the standard; fc is a frequency of the basic frame; M is a sampling bit width of the standard; ceil indicates rounding up; N is an over sampling rate; and N*M represents a total number of bits of the IQ data in one load sector of the standard; or, when fs is not an integer multiple of fc/K, mapping Q continuous IQ datas and the filling field in one load sector of the standard to P multi-frames in the CPRI radio frame, wherein, P, Q meet P*Nc*Naxc=Q*N*M+Nst, Nc=ceil[(fs*N*M)/(Naxc*fc/K)], fs is the sampling frequency of the standard; fc is the frequency of the basic frame; Nst indicates a number of bits of the filling field; M is the sampling bit width of the standard; N is the over sampleing rate; N*M represents the total number of bits of IQ data in one load sector of the standard; and ceil indicates rounding up.

When fs is not an integer multiple of fc/K, an value of P may be LCM[fs,(fc/K)]/fs, an value of Q may be LCM[(k*fs), fc]/fc, and LCM indicates finding the least common multiple. Location information of the IQ data frame header may be carried in the filling field.

The invention also provides a method for multi-standard IQ data mixed-mode transmission, comprising the following steps of:

after mapping IQ data to a CPRI radio frame according to the mapping method described in the invention, a source end transmitting the CPRI radio frame to a destination end; wherein, the source end is a RE and the destination end is a REC; or the source end is a REC and the destination end is a RE.

The REC may comprise one or more channel processing units of different standards, and a switch unit; when the source end is a REC and the destination end is a RE, the step of the source end transmitting the CPRI radio frame to the destination end after mapping the IQ data to the CPRI radio frame according to the mapping method described in the invention may comprise: after mapping the IQ data to the CPRI radio frame according to the mapping method described in the invention, the channel processing unit sending the CPRI radio frame to the switch unit; the switch unit aligning multi-frames in the CPRI radio frame received from the channel processing unit, performing a time slot switch for the received CPRI radio frame using the multi-frame as a period, and then transmitting the CPRI radio frame after the time slot switch to the destination end.

The REC may comprise one or more channel processing units of different standards, and an switch unit; when the destination end is a REC and the source end is a RE, the method may further comprise: the switch unit receiving the CPRI radio frame from one or more RE, aligning multi-frames in the received CPRI radio frame, performing a time slot switch for the received CPRI radio frame using the multi-frame as a period, switching the IQ data in each CPRI radio frame to the channel processing unit of a standard corresponding to the IQ data.

The method may further comprise: upon receiving the CPRI radio frame, the destination end recovering IQ data from the CPRI radio frame in the following way: when fs is an integer multiple of fc/K, determining Nc containers belonging to each load sector in a multi-frame through a header of the CPRI radio frame, and directly restoring the IQ data; or when fs is not an integer multiple of fc/K, determining Nc containers belonging to each load sector in a multi-frame through the header of the CPRI radio frame, finding an IQ data frame header according to a filling field characteristic, and restoring the IQ data; wherein, fs is a sampling frequency of a standard corresponding to the IQ data, and fc is a frequency of a basic frame.

The invention also provides an IQ data mapping apparatus, which is configured to: map IQ data of one or more standards to a CPRI radio frame, wherein, the CPRI radio frame comprises multiple multi-frames, and boundaries of the multi-frames are aligned with a header of the CPRI radio frame; each multi-frame comprises K basic frames, and each basic frame comprises a plurality of IQ sub-containers; one IQ sub-container constitutes one time slot; a number K of the basic frames and bit widths Naxc of the IQ sub-containers included in each multi-frame for different standards are identical; and a length of the CPRI radio frame is 10 ms.

The mapping apparatus may be configured to map the IQ data of one or more standards to the CPRI radio frame in the following way: for a standard, when fs is an integer multiple of fc/K, mapping IQ data in one load sector or the IQ data and a filling field in one load sector of the standard to Nc IQ sub-containers in one multi-frame in the CPRI radio frame;

wherein, Nc=ceil[(fs*N*M)/(Naxc*fc/K)]; fs is a sampling frequency of the standard; fc is a frequency of the basic frame; M is a sampling bit width of the standard; ceil indicates rounding up; N is an over sampling rate; and N*M represents a number of total bits of the IQ data in one load sector; or, for a standard, when fs is not an integer multiple of fc/K, mapping Q continuous IQ datas and the filling field in one load sector of the standard to P multi-frames in the CPRI radio frame, wherein, P, Q meet P*Nc*Naxc=Q*N*M+Nst, Nc=ceil[(fs*N*M)/(Naxc*fc/K)], fs is the sampling frequency of the standard; fc is the frequency of the basic frame; Nst indicates a number of bits of the filling field; M is the sampling bit width of the standard; N*M represents the total number of bits of the IQ data in one load sector, ceil indicates rounding up; N is an over sampling rate; and N*M represents the total number of bits of the IQ data in one load sector.

When fs is not an integer multiple of fc/K, a value of P may be LCM[fs,(fc/K)]/fs, a value of Q may be LCM[(k*fs),fc]/fc, LCM indicates finding the least common multiple. Location information of the IQ data frame header may be carried in the filling field.

The invention also provides a system for multi-standard IQ data mixed-mode transmission, comprising a source end and a destination end:

the source end is a RE, and the destination end is a REC; or the source end is a REC, and the destination end is a RE; the source end is configured to transmit a CPRI radio frame to a destination end after mapping IQ data to the CPRI radio frame according to the mapping method described in the invention.

In the above system, the REC may comprise one or more channel processing units of different standards, and an switch unit; the channel processing unit may be configured to send the CPRI radio frame to the switch unit after mapping the IQ data to the CPRI radio frame according to the mapping method described in the invention; the switch unit is configured to: when the source end is the REC, receive the CPRI radio frame from the channel processing unit of one or more standards, align multi-frames in the CPRI radio frame, perform a time slot switch for the received CPRI radio frame using the multi-frame as a period, and then transmit the CPRI radio frame to the destination end; and, when the destination end is the REC, receive the CPRI radio frame from one or more RE, align multi-frames in the received CPRI radio frame, perform a time slot switch for the received CPRI radio frame using the multi-frame as a period, switch the IQ data in each CPRI radio frame to the channel processing unit of a standard corresponding to the IQ data.

The destination end may be configured to recover the IQ data from the CPRI radio frame in following way upon receiving the CPRI radio frame: when fs is an integer multiple of fc/K, determining Nc containers belonging to each load sector in a multi-frame through a header of the CPRI radio frame, and restoring the IQ data directly; or, when fs is not an integer multiple of fc/K, determining Nc containers belonging to each load sector in a multi-frame through the header of the CPRI radio frame, finding an IQ data frame header according to a filling field characteristic, and recovering the IQ data.

The method in the invention enables a K-CHIP period to form a multi-frame, and every load sector data of each standard becomes a group of time slots in the multi-frame (different from dividing an AXC container based on the basic frame as defined in CPRI4.1). The multi-standard mixed-mode in the invention is simple to implement, the intermediate procedures of "transmission" and "switch" of the whole IQ link are independent of the standard.

PREFERRED EMBODIMENTS OF THE PRESENT INVENTION

Figure 1:
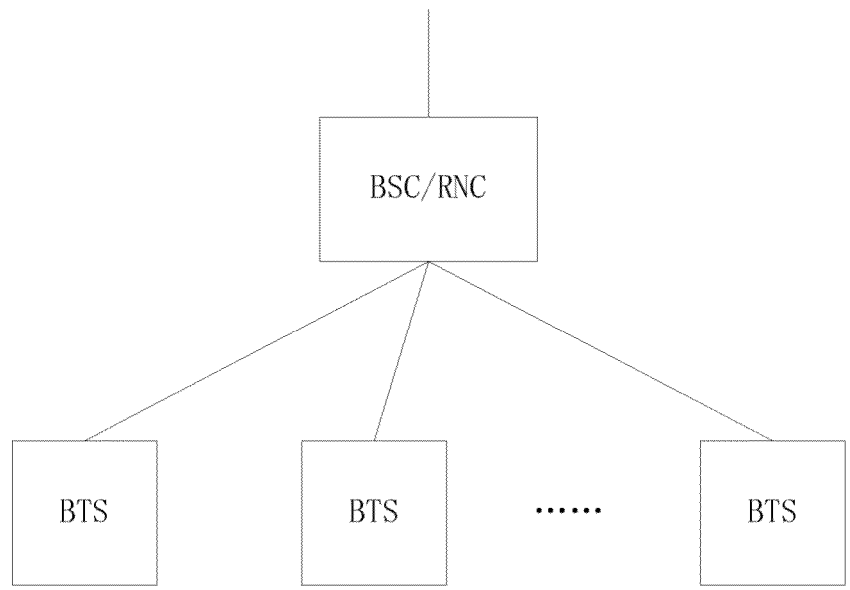
FIG. 1 is a structure diagram of the composition of a typical radio access network.
Figure 2:
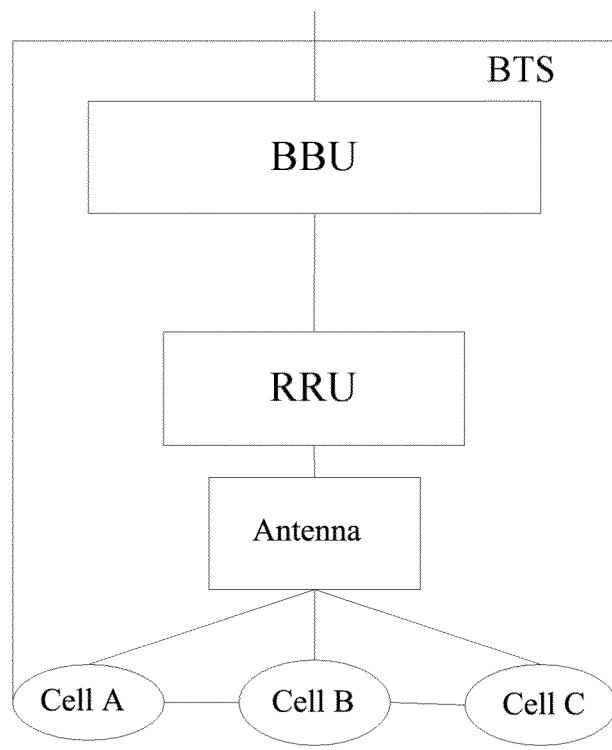
FIG. 2 is an illustration of the radio remote of a distributed BTS.
Figure 3:
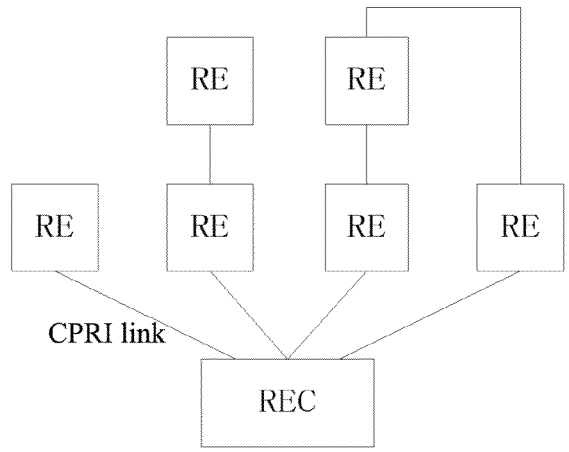
FIG. 3 is an illustration of the REC/RE networking connection.
Figure 4:
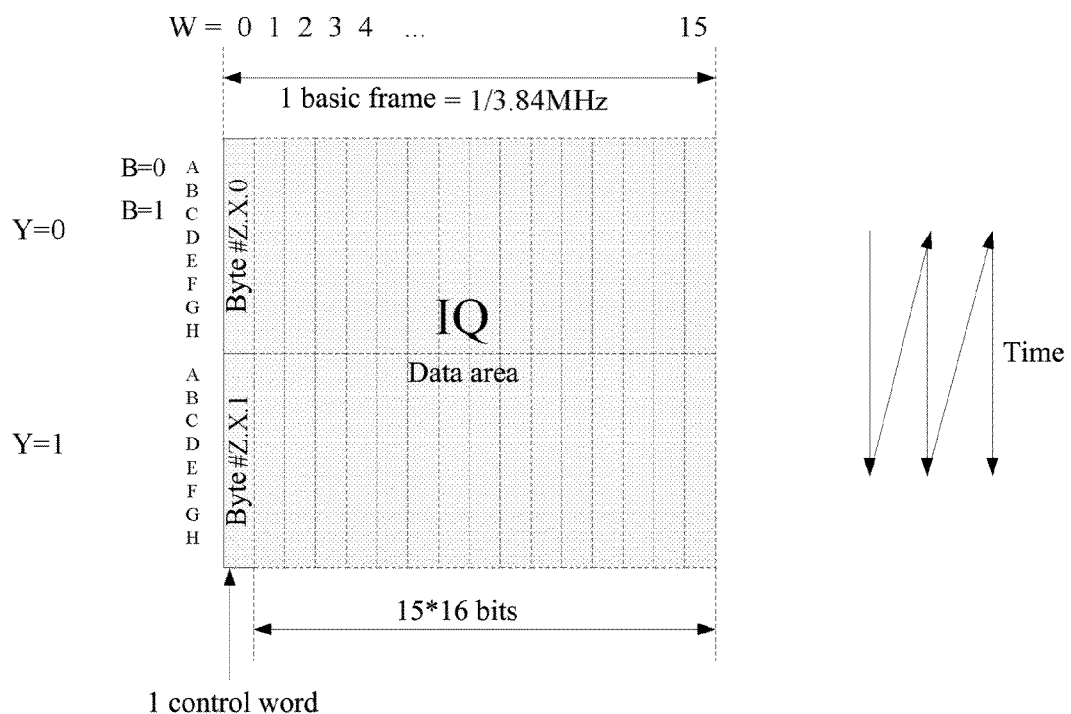
FIG. 4 is a structure diagram of a CPRI basic frame.
Figure 5:
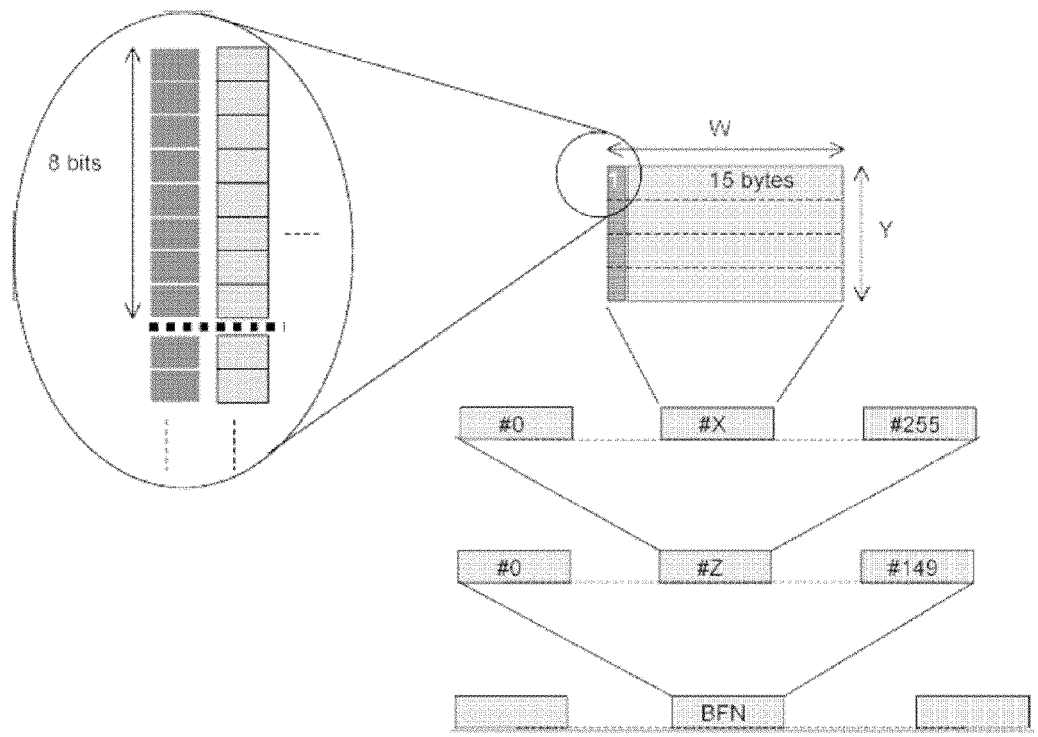
FIG. 5 is a structure diagram of a CPRI-10 ms radio frame.
Figure 6:
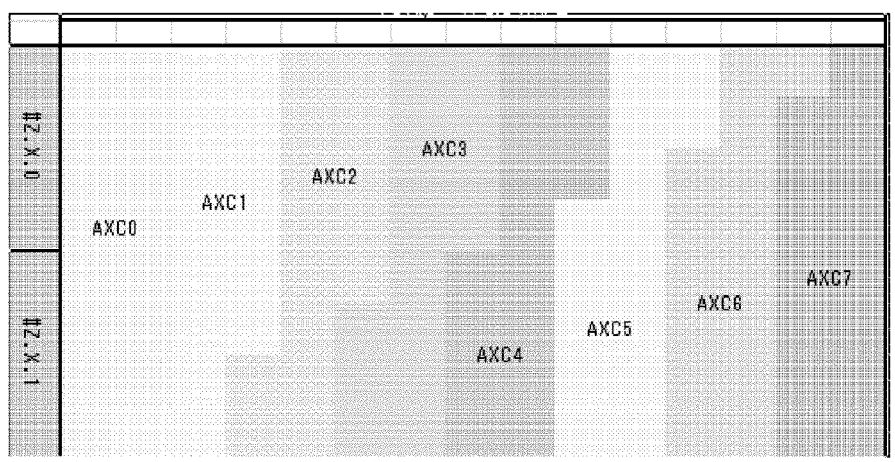
FIG. 6 is a diagram of the AXC container of WCDMA of CPRI2.1 norm.
Figure 7:
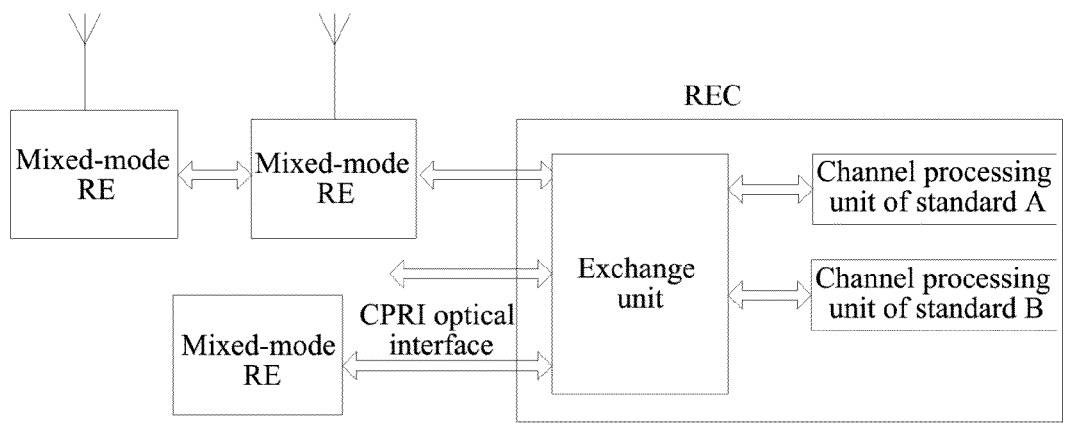
FIG. 7 is an illustration of a REC/RE multi-standard mixed-mode application scene.

The invention provides a CPRI radio frame format, and the length of the CPRI radio frame is 10 ms, which are as follows:

(1) AxC Container Block of various standards use a uniform cycle period value of K;

(2) IQ sub-containers (AxC-container) of various standards use a uniform size of Naxc;

(3) IQ data of every load sector of various standards are loaded into a group of Nc IQ sub-containers of K chip periods according to a certain rule (it maybe necessary to add filling fields firstly);

(4) the whole IQ sector inside a CPRI frame is partitioned according to AxC-container, K basic frames form a multi-frame as a period, and each IQ sub-container in a multi-frame constitutes a time slot;

(5) the K-chip boundary of the multi-frame is aligned with the CPRI radio frame header Fr.

The multi-standard mixed-mode transmission only needs to place one group of Nc time slots corresponding to each load sector in the multi-frame according to a certain rule.

The invention provides a method for IQ data mapping, comprising:

mapping IQ data of one or more standards to a CPRI radio frame, wherein, the IQ data in one load sector of one standard are mapped to Nc IQ sub-containers in a multi-frame in a CPRI radio frame, the CPRI radio frame comprises multiple multi-frames whose boundaries are aligned with the header of the CPRI radio frame, each multi-frame comprises K basic frames, each basic frame comprises several IQ sub-containers, one IQ sub-container constitutes one time slot, the bit width of an IQ sub-container is Naxc, the number K of basic frames and the bit width Naxc of IQ sub-containers included in a multi-frame for different standards are the same.

For any standard, the step of mapping the IQ data of the standard to the CPRI radio frame comprises:

when fs is an integer multiple of fc/K, mapping the IQ data in one load sector or the IQ data and a filling field in one load sector of the standard to Nc IQ sub-containers in one multi-frame in the CPRI radio frame; and calculating Nc according to the following equation: Nc=ceil[(fs*N*M)/(Naxc*fc/K)], wherein, fs is the sampling frequency of the standard, fc is the frequency of the basic frame, M is the sampling bit width of the standard, ceil indicates rounding up, N*M represents the total number of bits of IQ data in one load sector; N is an over sampling rate, and the value of N may be 2, 4 or other values, for example, N=2 when 1 multiple over sampling is used, and N=2 is taken for instance in the following examples for illustration, but the invention is not limited to N=2;

when fs is not an integer multiple of fc/K, mapping Q continuous IQ datas and the filling field in one load sector of the standard to P multi-frames in the CPRI radio frame, and P, Q meeting that P*Nc*Naxc=Q*N*M+Nst, Nc=ceil[(fs*N*M)/(Naxc*fc/K)], wherein, Nst indicates the number of bits of the filling field, M is the sampling bit width of the standard; calculating the Nc according to the following equation: Nc=ceil[(fs*N*M)/(Naxc*fc/K)], wherein, fs is the sampling frequency of the standard, fc is the frequency of the basic frame, M is the sampling bit width of the standard, and ceil indicates rounding up. Wherein, location information of an IQ data frame header is carried in the filling field.

Wherein, a method for determining the values of P, Q is: the P=LCM[fs,(fc/K)]/fs, the Q=LCM[(k*fs),fc]/fc, wherein, LCM indicates finding the least common multiple.

The invention also provides a method for multi-standard IQ data mixed-mode transmission which is easy to implement based on the new frame structure proposed in the invention, comprising:

after mapping IQ data to a CPRI radio frame according to the method described in the invention, a source end transmitting the CPRI radio frame to a destination end; wherein, the source end is a REC and the destination end is a RE; or the source end is a RE and the destination end is a REC.

The REC comprises one or more channel processing units of different standards, and an switch unit;

when the source end is a REC and the destination end is a RE, the processing made by the source end comprises: after mapping the IQ data to the CPRI radio frame according to the method described in the invention, the channel processing unit sending the CPRI radio frame to the switch unit; when receiving the CPRI radio frame from the channel processing unit of one or more standards, the switch unit aligning multi-frames in the CPRI radio frame, performing a time slot switch using the multi-frame as a period, and then transmitting the CPRI radio frame to the destination end.

When the source end is a RE and the destination end is a REC, the processing made by the destination end comprise: after receiving the CPRI radio frame from one or more RE, the switch unit aligning multi-frames in the CPRI radio frame, performing a time slot switch for the received CPRI radio frame using the multi-frame as a period, exchanging the IQ data in each CPRI radio frame to the channel processing unit of a standard corresponding to the IQ data.

The following can be achieved as long as software configures the switch unit with a suitable look-up table: in the downstream, a mixed-mode CPRI radio frame is obtained by switching the outputs of various channel processing units into a link; in the upstream, a CPRI radio frame of a single standard is extracted from the mixed-mode CPRI radio frame to the channel processing units corresponding to each standard. The RE processes similarly. The switch table of the RE may be transmitted through the C&M (control and maintenance) channel.

When receiving the CPRI radio frame, the destination end further analyzes the IQ data from the received CPRI radio frame. Wherein, when fs is an integer multiple of fc/K, Nc containers belonging to each load sector in a multi-frame are determined by a header of the CPRI radio frame, and the IQ data are directly restored; when fs is not an integer multiple of fc/K, Nc containers belonging to each load sector in a multi-frame are determined by a header of the CPRI radio frame, and then an IQ data frame header is found according to a filling field characteristic, and the IQ data are recovered.

The channel processing units of all standards in the REC map their IQ data to the time slots in the multi-frame according to the above frame format, and place according to a fixed format and then output them. When IQ switch or combination/distribution is needed, it only needs to firstly align all the K-CHIP multi-frames, and then perform time slot switch easily, using K-CHIP as a period. The IQ switch unit is independent of the standard, and when a new standard is added, it only needs to map the IQ of the standard to a group of time slots of the frame structure inside its channel processing unit, without the need to modify the switch unit. The system structure is flexible.

The invention also provides a method for transmitting multi-standard IQ timing information (determining the IQ data frame header of various standards) in the new frame structure proposed by in the invention, which uses the following scheme:

when the standard IQ data sampling frequency fs is an integer multiple of (fc/K), Nc containers belonging to each load sector in a multi-frame are determined by the header of the CPRI radio frame, and the IQ data are directly restored;

when the standard data IQ sampling frequency fs is not an integer multiple of fc/K, firstly Nc containers belonging to each load sector in a multi-frame are determined by the header of the CPRI radio frame, and then an IQ data frame header is found according to a filling field characteristic, and the IQ data can be restored.

The present invention differs from the existing IQ mapping method of the CPRI4.1 protocol in that:

1) the values of K, Naxc for all standards in the invention are fixed, and they do not change along with the standard;

2) a method of dependently filling by each load sector to place IQ data of one load sector into a group of Nc containers in the K-CHIP multi-frame is adopted for all standards (including narrow-band standard, such as CDMA). While in the existing load method 3 in CPRI4.1, for CDMA standard, Na=3 load sectors are used to place in the location of Nc=1 IQ container, in the period of K=25 basic frames, the first 24 basic frames transmit their 8 sampling values, and thereafter Nv=1 null frame is attached, which is equivalent to adding filling by binding 3 load sectors together;

3) the invention uses a group of sub-containers in the K-CHIP multi-frame to distinguish different load sectors, while the existing technology uses a group of AXC containers in one basic frame to distinguish different load sectors. By using the method in the invention, the data of a certain load sector may be loaded by a group of Nc sub-containers in the K-chip multi-frame, and the Nc sub-containers may be selected randomly from all the sub-containers in the K-chip multi-frame and do not need to have the same AXC container (column) locations in each basic frame of the 0, 1, , , , K-1;

4) for the standard that the sampling frequency fs is not a integer multiple of 3.84M, the frame header symbol is carried by filling an specific information field and then placing the data after the filling into a group of IQ sub-containers; the receiving end is able to restore the frame header location of the IQ by analyzing the data themselves inside the IQ sub-container. Unlike the method defined in the existed CPRI4.1 protocol, the cycle period K of each standard AxC-container-block is different from one another, and the 10 ms frame header Fr of CPRI is taken as a common starting point and then a counting is made circularly according to periods of all standards to determine the IQ data frame header location of AxC-container-block.

The method described in the invention enables the K-CHIP period to form a multi-frame and each load sector data of all standards to become a group of time slots in the multi-frame (different from dividing the AxC container based on the basic frame as defined in CPRI4.1). The advantages of such method are that: the multi-standard mixed-mode is easy to implement, and the intermediate procedures of "transmission" and "switch" in the whole IQ link are independent of the standard.

Figure 8:
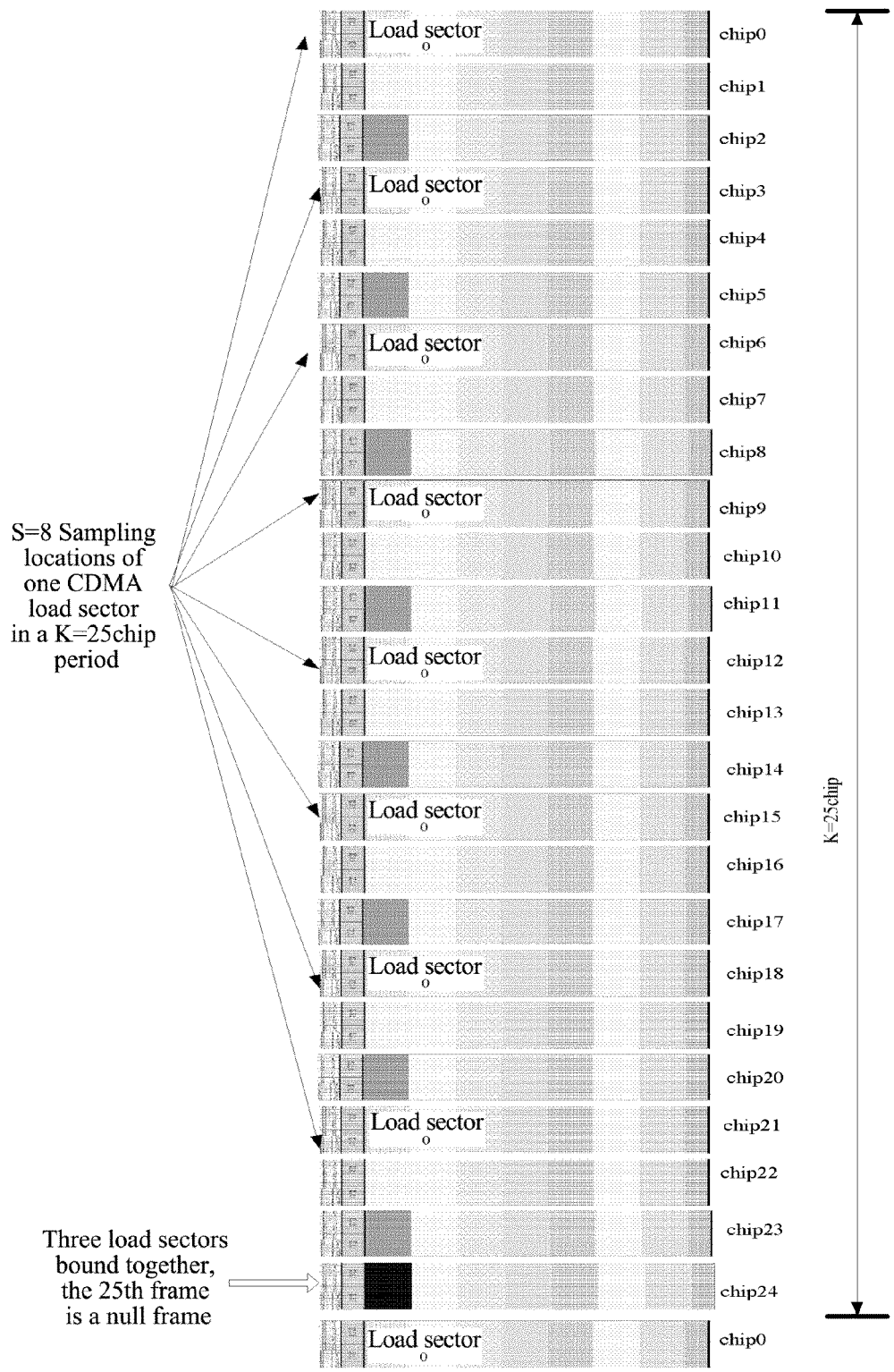
FIG. 8 is an illustration of transmitting a CDMA load sector through the existing CPRI4.1 method 3 (K=25)
Figure 9:
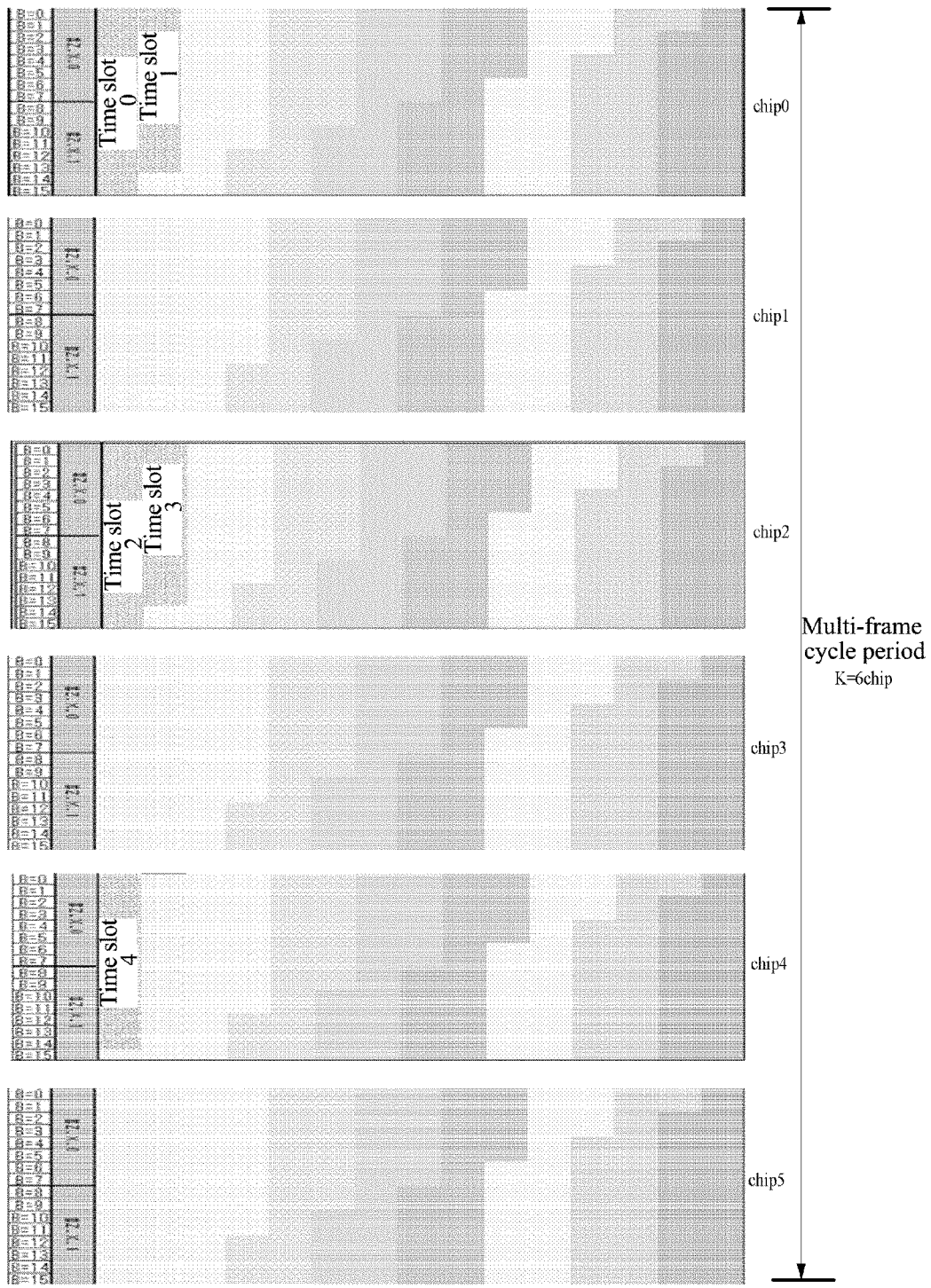
FIG. 9 is an illustration of mapping a CDMA load sector to Nc=5 time slots in the multi-frame of 6chip in the invention.
Figure 10:
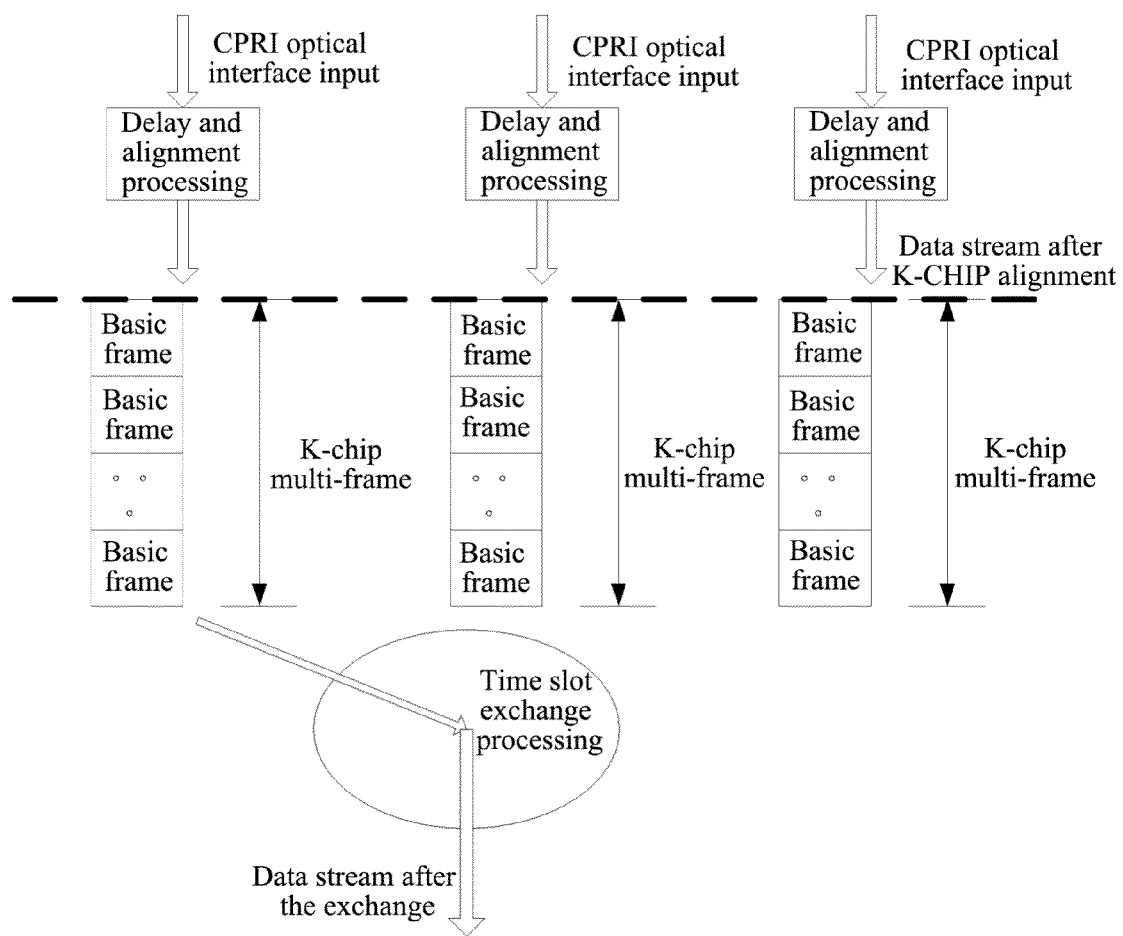
FIG. 10 is an illustration of performing mixed-mode IQ switch when the multi-frame periods K of all standards are equal in the invention.

A comparative analysis may be made with reference to FIGS. 8-10: wherein, FIG. 8 illustrates transmission of CDMA load sectors using the mapping method 3 of the existing CPRI4.1, wherein the K of its AxC-container-block is equal to 25, and the cycle period is very large; meanwhile the container size may be different from those of other standards. It can be seen that a mixed-mode IQ switch is very difficult for the existing frame structure when different standards are placed in different AxC containers (columns) respectively with different cycle periods of K1 and K2. FIG. 9 is a diagram of mapping one CDMA load sector to Nc=5 time slots in the multi-frame having K=6 chip (uniform cycle period) according to the method described in the invention.

FIG. 10 is a diagram of the mixed-mode IQ switch in the invention (all standards using the same multi-frame period K). By using the scheme described in the invention, since each standard load sector is a group of time slots in the K-CHIP multi-frame and time slot sizes Naxc are equal, it is very easy to align K-CHIP. After the alignment of K-CHIP, a time slot switch can be made using a time division multiplex method, which is easy to implement, with the K-CHIP being the cycle period. The time slot switch actually completes the mixed-mode IQ switch. The time slot switch process only needs to refer to the look-up table, and has no relation with the standard. While in the existed technology, the AxC-container-block periods of various standards are not identical, wherein, some container columns (standard A) in the basic frame use K1 as the period to circulate, and some columns (standard B) use K2 as the period to circulate. Upstream multiple inputs are difficult to align and switch cannot be performed using a fixed uniform period. It can be seen from FIG. 10 that the IQ switch in the method described in the invention is easy to implement.

The implementation of the technical scheme will be further described below in detail with reference to the figures.

Figure 11:
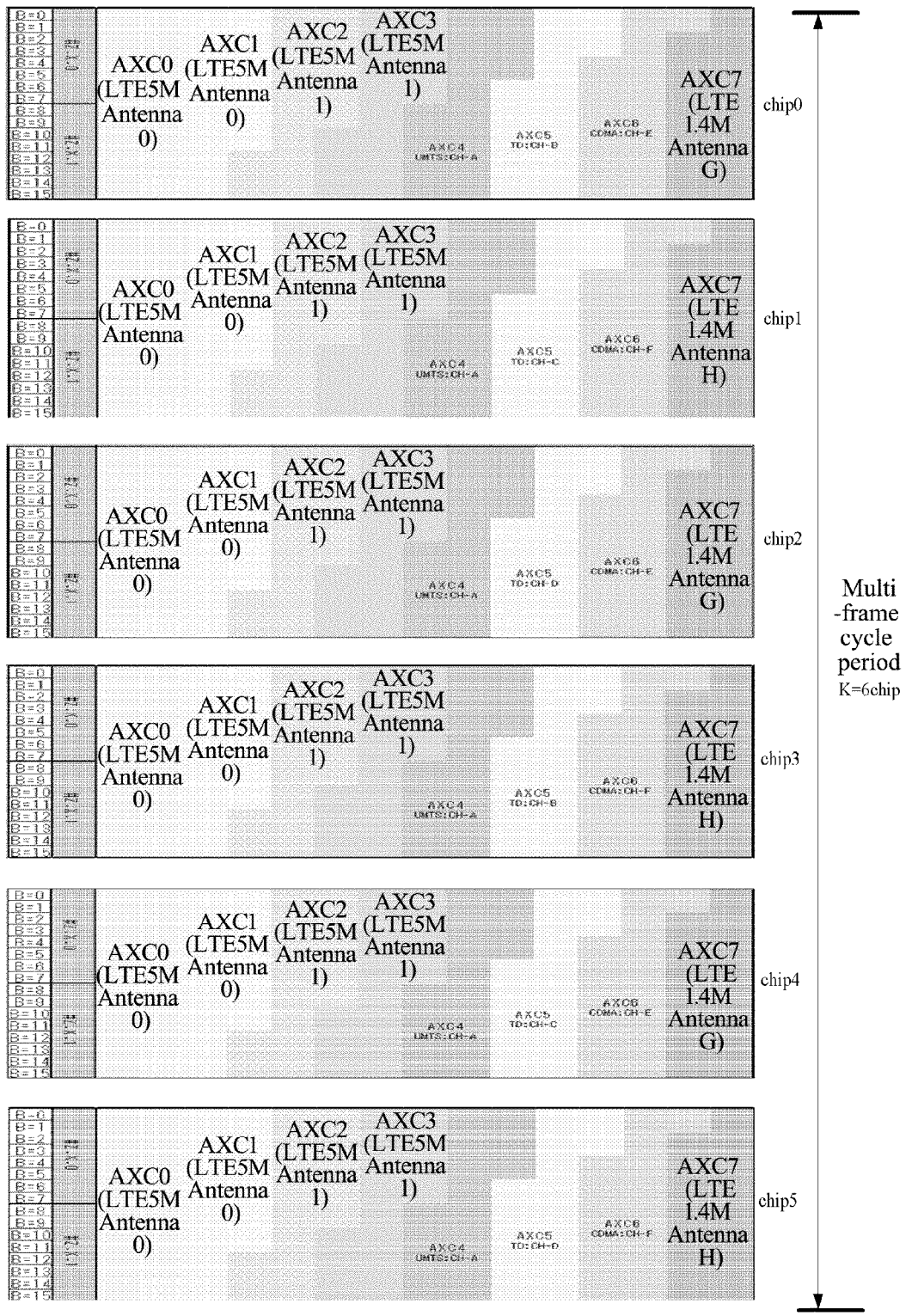
FIG. 11 is a structure diagram of a CPRI frame in a multi-standard mixed-mode configuration example at a line rate of 1.2288 G in the invention.

FIG. 11 is a diagram of the structure of a frame in a multi-standard mixed-mode example obtained according to the technical scheme described in the invention at a line rate of 1.2288 g for the CPRI. In the example, it needs to transmit one LTE sector with two antennas (antenna 0 and antenna 1) having a band width of 5M, one UMTS load sector (channel A), 3 TD load sectors (channel B/C/D), 2 CDMA load sectors (channel E/F), and one LTE sector with two antennas (G/H) having a band width of 1.4M through one fiber. In the present example, the mixed-mode frame uses the parameters: Naxc=15 (bit width of a sub-container), and K=6(the cycle period of the multi-frame).

The method for designing a mixed-mode CPRI frame structure will be described in detail below.

Step one, values of K and Naxc parameters are firstly determined.

For the selection of a uniform K value, it is only required in itself that the total number 256*150=38400 of basic frames included in a 10 ms period is an integer multiple of K, i.e. K is only required to be a factor of 38400. The purpose is to make the multi-frame boundaries aligned with the CPRI-10 ms-Fr frame header. But for the actual value selection, it needs to consider factors such as band width waste, process delay and so on (which will be described in detail at the end of the section) in various existing standards in order to select a moderate value. For example, K=6 is selected in the case, in which case, the sampling frequency of TD-SCDMA is 1.28M, which is two multiples of fc/K, the sampling frequency of LTE-1.4M is 1.92M, which is three multiples of fc/K, and sampling frequencies of other LTE band widths are all integer multiples of fc/K. Thus, an integer number of sampling values of TD/WCMDA/LTE standards are included in K CHIP periods, and such 3G/4G standards defined in 3GPP can be well compatible (just able to load with no waste). Other standards, such as WIMAX/CDMA and so on, still use the fixed K, the sampling frequency fs is not integer multiples of fc/K, and addition of filling fields is needed.

For the selection of Naxc, it can be considered to use directly the container size 30 bit of WCDMA itself, or one of its scaling factors (such as ½, ⅓, ⅕), such as 15 bit (load Half-axc), 10 bit, 6 bit and so on. It must be a factor of 30 bit, which enables a plurality of time slots to compose completely a WCMDA load sector to place (compatible with the existing CPRI2.1 definition). Naxc determines the size of a container. When the sampling frequency fs of a standard is not an integer multiple of fc/K, addition of filling is needed, and IQ is placed in Nc time slots in the K-chip period (the band width of each time slot is Naxc* fc/K). If the selected Naxc is large (for example 30 bit), it means that the particles are large, and accordingly there will be much bandwidth waste (in the worst condition, each load sector wastes the bandwidth of one time slot). If the selected value is small, there will be little bandwidth waste, but the number of time slots needing to be processed in the K-CHIP period is large, and processing ability is difficult to get if the number is too large.

Likewise, for those standards (CDMA, WIMAX etc.) requiring filling, the smaller the selected K is, i.e., the particles are big, the more the waste of the bandwidth is; the larger the selected K is, the less the waste of the bandwidth is, but the period of the multi-frame will be long, and the process delay will be increased. Parameters of K=6 and Naxc=15 are moderate selections.

Step two, the method for mapping IQ data of a certain standard to a group of Nc time slots needs to be determined.

This step divides into two situations of (a), (b) according to the characteristics of the sampling frequency fs of the standard.

(a) if fs is an integer multiple of fc/K, the number of time slots to be occupied, which includes S=fs/(fc /K) IQ sampling values, are calculated according to the equation Nc=ceil [(fs*2*M)/(Naxc*fc/K)] in the K-chip multi-frame. Wherein, the numerator fs*2*M in the Nc calculation equation is the IQ data bandwidth of the standard, and the denominator Naxc*fc/K is the transmission bandwidth for each time slot, and the number of needed timeslots is obtained by dividing the former with the latter.

For example, for the WCDMA standard, the sampling bit width, M=15 bit, fs=3.84M; Nc=12, i.e. 12 timeslots are needed to transmit a WCMDA load sector. In the K=6 chip cycle period of the multi-frame, each chip transmits 2 time slots, one time slot for placing I path data, and the other time slot for Q path data. Thus a WCDMA standard load sector placement compatible with the existing CPRI2.1 may be constructed completely.

Still for example, for LET-1.4M, sampling frequency fs=1.92M, sampling bit width M=15, and Nc=6 is calculated according to the equation, i.e. 6 time slots in total are needed to transmit one antenna data.

If the sampling bit width of a certain standard is not equal to 15, and the situation that (2*M)/Naxc is not an integer occurs, Nc time slots are calculated according to the equation, including filling fields in addition to loading IQ. In such a situation, the number of IQ sampling values included in one multi-frame is always an integer S.

Therefore, for the load sector data of a standard whose sampling frequency is an integer multiple, the first one of Nc time slots always corresponds to the first starting point of S IQ sampling points. At the receiving end, the frame header of the multi-frame may be obtained according to CPRI-10 ms-Fr frame header, i.e. IQ data frame timing information may be obtained.

(b) if fs is not an integer multiple of fc/K, firstly (fs*2*M)/(Naxc*fc/K) is calculated using the same equation, and the smallest integer larger than the (fs*2*M)/(Naxc*fc/K) is found as the number Nc of time slots occupied in one K-chip multi-frame, i.e. make ceil[(fs*2*M)/(Naxc*fc/K)] as Nc, thus ensuring that the band width for the transmission is more than the band width for the IQ data.

Then in the transmission passage, every P=LCM[fs,(fc/K)]/fs multi-frame periods correspond to Q=LCM[(k*fs),fc]/fc IQ datas in total, and meanwhile Nst=P*Nc*Naxc-Q*2M bits filling fields are attached. The data stream after the filling is matching to the multi-frame frequency and can be loaded exactly in one group of Nc time slots. At the moment, the data stream is not the original IQ data any longer.

The content of the filing field needs to be designed to make it include the location information of the IQ frame header so as to facilitate the receiving end to restore IQ data from the time slot data in the multi-frame. This is equivalent to processing of standard adaptation, and the adaptation processing only needs to be performed at the source end (the channel processing unit in the REC), and the destination end (the RE). The standard related information will not be seen any more during the transmission, switch in the whole IQ link, and it only needs to see the Nc time slots inside the K-CHIP multi-frame. The receiving end and the sending end may consult on the filling method for filling fields, or the system presets the filling method, and so on. The invention does not define the specific method for filling the filling fields or the filling information thereof, provided that the receiving end can obtain sufficient information and cancel the filling bits from the received CPRI radio frame to restore the IQ data.

When fs in not an integer multiple of fc/K, the design method for the filling fields may be determined according to the frequency characteristic and difficulty level for implementation of a certain standard (there should always exist several feasible methods). The CDMA2000-1x reverse link is taken for instance to illustrate: reverse data format: two antennas/IQ two paths/two times over sampling/sampling bit width 4 bit, plus 1 bit-RSSI; 33 bit in total. K=6, Naxc=15. 1.2288M is not an integer multiple of 3.84M/6. Firstly, the number Nc of time slots is calculated by using the equation (fs*2*M)/(Naxc*fc/K), wherein the 2*M is equivalent to the IQ data bit width and is replaced with 33 bit, which is put into the equation to obtain (1.2288M*33)/(15*3.84M/6)=4.224, finding the smallest integer bigger than 4.224, and obtaining Nc=5. Q=48 IQ values correspond to every P=25 multi-frames. 15*5*25−48*33=291 bits need to be inserted into the data stream for filling in addition to the valid data. In addition, 14*5*25>48*33 is found according to band width calculation, i.e. the bandwidth will be enough if it only needs to occupy the low 14-bit in the 15-bit in each time slot to transmit data; the highest bit of the bit 14 may be used to indicate the starting point location of the filling field. One time of period circulation output of every 25 multi-frames is valid, and the outputs at the other moments are invalid. The corresponding RRU receiving end may find the IQ frame header according to the indication of the bit 14 and cancel the filling to restore the IQ data.

In addition, for the IQ interleaved processing of CPRI, the contents of the above mentioned 'IQ sub-container', 'time slot' are both the original data before the interleaving. To be compatible with the WCDMA mapping method regulated by CPRI2.1, several corresponding time slots for constituting one AXC (30 bit) location may be interleaved together at the CPRI sending end (the AXC location that is not a WCDMA standard is also processed according to the process); the load sectors of WCDMA are compatible with the format regulated by CPRI2.1; de-interleaving is performed at the receiving end to obtain the time slot we need.

The invention also provides an IQ data mapping apparatus, which is configured to map the IQ data of one or more standards to a CPRI radio frame, wherein the IQ data in one load sector of one standard is mapped to Nc IQ sub-containers in one multi-frame in the CPRI radio frame, and the CPRI radio frame comprises multiple multi-frames; the boundaries of the multi-frames are aligned with the header of the CPRI radio frame, and each multi-frame comprises K basic frames; each basic frame comprises a plurality of IQ sub-containers, and one IQ sub-container constitutes one time slot; the bit width of the IQ sub-container is Naxc, and the number K of the basic frames and the bit widths Naxc of the IQ sub-container included in each multi-frame for different standards are identical; and the length of the CPRI radio frame is 10 ms.

Wherein, the mapping apparatus is configured to map IQ data of one or more standards to a CPRI radio frame in following way:

for a standard, when fs is an integer multiple of fc/K, IQ data in one load sector or the IQ data and a filling field in one load sector of the standard are mapped to Nc IQ sub-containers in one multi-frame in the CPRI radio frame; the Nc is calculated according to the following equation: Nc=ceil[(fs*N*M)/(Naxc*fc/K)]; wherein, fs is the sampling frequency of the standard; fc is the frequency of the basic frame; M is the sampling bit width of the standard; ceil indicates rounding up; N is an over sampling rate; and N*M represents the total number of bits of the IQ data in one load sector.

When fs is not an integer multiple of fc/K, Q continuous IQ datas and the filling field of the standard are mapped to P multi-frames in the CPRI radio frame, and P, Q meet P*Nc*Naxc=Q*N*M+Nst, Nc=ceil[(fs*N*M)/(Naxc*fc/K)], wherein, Nst indicates the number of bits of the filling field; M is a sampling bit width of the standard; N*M represents a total number of bits of the IQ data in one load sector; the Nc is calculated according to the following equation: Nc=ceil[(fs*N*M)/(Naxc*fc/K)]; wherein, fs is the sampling frequency of the standard; fc is the frequency of the basic frame; M is the sampling bit width of the standard; ceil indicates rounding up; N is an over sampling rate; and N*M represents the total number of bits of the IQ data in one load sector. Wherein, the P=LCM[fs,(fc/K)]/fs, the Q=LCM[(k*fs),fc]/fc, LCM indicates finding the least common multiple. Wherein, location information of the IQ data frame header may be carried in the filling field.

The invention also provides a system for multi-standard IQ data mixed-mode transmission, comprising a source end and a destination end:

the source end is a RE, and the destination end is a REC; or the source end is a REC, and the destination end is a RE.

The source end is configured to transmit a CPRI radio frame to the destination end after mapping IQ data to the CPRI radio frame according to the mapping method described in the invention.

Wherein, the REC comprises one or more channel processing units of different standards, and a switch unit;

the channel processing unit is configured to send the CPRI radio frame to the switch unit after mapping the IQ data to the CPRI radio frame according to the mapping method described in the invention;

the switch unit is configured to:

when the source end is the REC, receive the CPRI radio frame from the channel processing unit of one or more standards, align multi-frames in the CPRI radio frame, perform a time slot switch for the received CPRI radio frame using the multi-frame as a period, and then transmit the CPRI radio frame to the destination end; and, when the destination end is the REC, receive the CPRI radio frame from one or more REs, align multi-frames in the received CPRI radio frame, perform a time slot switch for the received CPRI radio frame using the multi-frame as a period, switch the IQ data in each CPRI radio frame to the channel processing unit of a standard corresponding to the IQ data.

Wherein, the destination end is configured to analyze the IQ data from the CPRI radio frame in following way when receiving the CPRI radio frame:

when fs is an integer multiple of fc/K, Nc containers belonging to each load sector in a multi-frame are determined through the header of the CPRI radio frame, and the IQ data are restored directly; and when fs is not an integer multiple of fc/K, Nc containers belonging to each load sector in a multi-frame are determined through the header of the CPRI radio frame, then find an IQ data frame header according to a filling field characteristic, and the IQ data are restored.

The invention is not limited to the above specific examples (not limited to the CPRI protocol, the specific values of Naxc, K, or the specific definition methods for the filling field), and any modifications, equivalent replacements, improvements and so on made to the invention by those skilled in the art without deviating from the spirit and scope of the invention should all fall within the protection scope of the invention.

INDUSTRIAL APPLICABILITY

Compared with the prior art, the invention makes the multi-standard mixed-mode BTS easy to implement, and the intermediate procedures of "transmission" and "switch" in the whole IQ link are independent of the standard.

What is claimed is:

1. A method for mapping and communicating IQ data, between a source end and a destination end, comprising:
configuring the source end as a radio equipment (RE) or a radio equipment controller (REC) and corresopondingly configuring the destination end as an REC or an RE; wherein the mapping of the IQ data comprises, mapping the IQ data of one or more different standards to a common public radio interface (CPRI) radio frame, wherein, the CPRI radio frame comprises multiple multi-frames, and boundaries of the multi-frames are aligned with a header of the CPRI radio frame; and each multi-frames comprises K basic frames, and each of the K basic frames comprises a plurality of IQ sub-containers; each of the plurality of the IQ sub-containers constitutes one time slot; the number K of the basic frames and bit widths Naxc of the plurality of the IQ sub-containers included in each of the multi-frames for the one or more different standards are identical; and a length of the CPRI radio frame is 10 ms; and transmitting the CPRI radio frame from the source end to the destination end.

2. The method according to claim 1, wherein,
for any standard, fs indicates a sampling frequency of the standard; fc indicates a frequency of the basic frame; M indicates a sampling bit width of the standard; ceil indicates rounding up; N indicates an over sampling rate; and N*M represents a total number of bits of the IQ data in one load sector of the standard; the step of mapping the IQ data of the standard to the CPRI radio frame comprises:
when fs is an integer multiple of fc/K, mapping the IQ data in one load sector or the IQ data and a filling field in one load sector of the standard to Nc IQ sub-containers in one multi-frame in the CPRI radio frame; wherein, Nc=ceil[(fs*N*M)/(Naxc*fc/K)]; or,
when fs is not an integer multiple of fc/K, mapping Q continuous IQ data and the filling field in one load sector of the standard to P multi-frames in the CPRI radio frame, wherein, P and Q meet P*Nc*Naxc=Q*N*M+Nst, Nc=ceil[(fs*N*M)/(Naxc*fc/K)], and Nst indicates the number of bits of the filling field.

3. The method according to claim 2, wherein, when fs is not an integer multiple Of fc/K, said P=LCM[fs,(fc/K)]/fs, and said Q=LCM[(k*fs),fc]/fc, wherein LCM indicates finding the least common multiple.

4. The method according to claim 2, wherein when fs is not an integer multiple Of fc/K, the filling field carries location information of an IQ data frame header.

5. A method for multi-standard IQ data mixed-mode transmission, comprising steps of:
after mapping IQ data to a common public radio interface (CPRI) radio frame according to the method described in claim 1, a source end transmitting the CPRI radio frame to a destination end; wherein, the source end is a radio equipment (RE) and the destination end is a radio equipment controller (REC); or the source end is a REC and the destination end is a RE.

6. The method according to claim 5, wherein,
the source end is the REC, which comprises one or more channel processing units of different standards and a switch unit, and the destination end is a RE;
the step of the source end transmitting the CPRI radio frame to the destination end after mapping the IQ data to the CPRI radio frame according to the method described in claim 1:
after mapping the IQ data to the CPRI radio frame according to the method described in claim 1, the channel processing unit sending the CPRI radio frame to the switch unit; the switch unit aligning multi-frames in the CPRI radio frame received from the channel processing unit, performing a time slot switch for the received CPRI radio frame using the multi-frame as a period, and then transmitting the CPRI radio frame after the time slot switch to the destination end.

7. The method according to claim 5, wherein,
the destination end is the REC, which comprises one or more channel processing units of different standards and a switch unit, and the source end is a RE;
the method further comprises: the switch unit receiving the CPRI radio frame from one or a plurality of REs, aligning multi-frames in the received CPRI radio frame, performing a time slot switch for the received CPRI radio frame using the multi-frame as a period, switching the IQ data in each CPRI radio frame to the channel processing unit of a standard corresponding to the IQ data.

8. The method according to claim 5, further comprising:
upon receiving the CPRI radio frame, the destination end recovering the IQ data from the CPRI radio frame in a following way: when fs is an integer multiple of fc/K, determining Nc containers belonging to each load sector in a multi-frame of the CPRI radio frame through a header of the CPRI radio frame, and directly restoring the IQ data; or when fs is not an integer multiple of fc/K, determining Nc containers belonging to each load sector in the multi-frame of the CPRI radio frame through the header of the CPRI radio frame, finding an IQ data frame header according to a filling field characteristic, and restoring the IQ data;

wherein, fs is a sampling frequency of a standard corresponding to the IQ data, and fc is a frequency of a basic frame.

9. An apparatus configured to map and communicate IQ data between a source end and a destination end, comprising:

configure the source end as a radio equipment (RE) or a radio equipment controller (REC) and correspondingly configure the destination end as an REC or an RE;

map the IQ data of one of more different standards to a common public radio interface (CPRI) radio frame, wherein, the CPRI radio frame comprises multiple multi-frames, and boundaries of the multi-frames are aligned with a header of the CPRI radio frame; each of the multi-frames comprises K basic frames, and each of the basic frames comprises a plurality of IQ sub-containers; each of the plurality of the IQ sub-containers constitutes one time slot; the number K of the basic frames and bit widths Naxc of the plurality of the IQ sub-containers included in each of the multi-frames of the one or more different standards are indentical and a lenght of the CPRI radio frames is 10 ms; and transmitted the CPRI radio frame from the source end to the destination end.

10. The apparatus according to claim 9, wherein said apparatus is configured to map the IQ data of one or more standards to the CPRI radio frame in a following way:

for one standard, fs indicating a sampling frequency of the standard, fc indicating a frequency of the basic frame, M indicating a sampling bit width of the standard, ceil indicating rounding up, N indicating an over sampling rate and N*M representing a total number of bits of the IQ data in one load sector of the standard, when fs is an integer multiple of fc/K, the IQ data in one load sector or the IQ data and a filling field in one load sector of the standard being mapped to Nc IQ sub-containers in one multi-frame in the CPRI radio frame; wherein, Nc=ceil[(fs*N*M)/(Naxc*fc/K)]; or, when fs is not an integer multiple of fc/K, Q continuous IQ data and the filling field in one load sector of the standard being mapped to P multi-frames in the CPRI radio frame, wherein, P and Q meet P*Nc*Naxc=Q*N*M+ Nst, Nc=ceil[(fs*N*M)/(Naxc*fc/K)], and Nst indicates the number of bits of the filling field.

11. The apparatus according to claim 10, wherein, when fs is not an integer multiple of fc/K, said P=LCM[fs,(fc/K)]/fs, and said Q=LCM[(k*fs),fc]/fc, wherein LCM indicates finding the least common multiple.

12. The apparatus according to claim 10, wherein, when fs is not an integer multiple of fc/K, the filling field carries location information of an IQ data frame header.

13. A system for multi-standard IQ data mixed-mode transmission, comprising a source end and a destination end, wherein, the source end is a radio equipment (RE), and the destination end is a radio equipment controller (REC); or the source end is the REC, and the destination end is the RE;

the source end is configured to transmit a common public radio interface (CPRI) radio frame to the destination end after mapping the multi-standard IQ data to the CPRI radio frame, wherein the mapping comprises:

mapping the multi-standards IQ data of one of more different standards to the CPRI radio frame, wherein the CPRI radio frame comprises multiple multi-frames, and boundaries of the multi-frames are aligned with a header of the CPRI radio frame; each of the multi-frames comprises K basic frames, and each of the K basic frames comprises a plurality of IQ sub-containers; each of the plurality of the IQ sub-containers constitutes one time slot; wherein the number K of the basic frames and bit widths Naxc of the IQ sub-containers included in each of the, multi-frames for the one or more different standards are identical; and a length of the CPRI radio frame is 10 ms.

14. The system according to claim 13, wherein, the REC comprises one or more channel processing units of different standards and an switch unit;

the channel processing unit is configured to send the CPRI radio frame to the switch unit after mapping the IQ data to the CPRI radio frame according to the method described in claim 1;

the switch unit is configured to: when the source end is the REC, receive the CPRI radio frame from the channel processing unit, align multi-frames in the CPRI radio frame, perform a time slot switch for the received CPRI radio frame using the multi-frame as a period, and then transmit the CPRI radio frame to the destination end; and, when the destination end is the REC, receive the CPRI radio frame from one or more REs, align multi-frames in the received CPRI radio frame, perform a time slot switch for the received CPRI radio frame using the multi-frame as a period, switch the IQ data in each CPRI radio frame to the channel processing unit of a standard corresponding to the IQ data.

15. The system according to claim 13, wherein, the destination end is configured to recover the IQ data from the received CPRI radio frame in a following way upon receiving the CPRI radio frame: when fs is an integer multiple of fc/K, determining Nc containers belonging to each load sector in a multi-frame of the CPRI radio frame through a header of the CPRI radio frame, and restoring the IQ data directly; or, when fs is not an integer multiple of fc/K, determining Nc containers belonging to each load sector in the multi-frame of the CPRI radio frame through the header of the CPRI radio frame, finding an IQ data frame header according to a filling field characteristic, and recovering the IQ data;

wherein, fs is a sampling frequency of a standard corresponding to the IQ data, and fc is a frequency of a basic frame.

* * * * *